(12) United States Patent
Kruger et al.

(10) Patent No.: US 7,849,256 B2
(45) Date of Patent: Dec. 7, 2010

(54) MEMORY CONTROLLER WITH RING BUS FOR INTERCONNECTING MEMORY CLIENTS TO MEMORY DEVICES

(75) Inventors: Warren F. Kruger, Sunnyvale, CA (US); Patrick Law, Cupertino, CA (US); Alexander Miretsky, Thornhill (CA)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1093 days.

(21) Appl. No.: 11/484,191

(22) Filed: Jul. 11, 2006

(65) Prior Publication Data

US 2008/0016254 A1 Jan. 17, 2008

(51) Int. Cl.
*G06F 13/37* (2006.01)
(52) U.S. Cl. ...................................... 711/105; 711/151
(58) Field of Classification Search ................. 711/105, 711/158, 151
See application file for complete search history.

(56) References Cited

U.S. PATENT DOCUMENTS

| | | | | |
|---|---|---|---|---|
| 5,341,374 A | * | 8/1994 | Lewen et al. | 370/450 |
| 5,878,227 A | * | 3/1999 | Wade et al. | 709/235 |
| 6,836,815 B1 | | 12/2004 | Purcell et al. | |
| 2002/0159320 A1 | * | 10/2002 | Lien et al. | 365/222 |
| 2003/0009618 A1 | * | 1/2003 | Regev et al. | 711/108 |
| 2006/0031593 A1 | * | 2/2006 | Sinclair | 709/251 |

OTHER PUBLICATIONS

Mohammed Ilyas, "Counter Rotating Slotted Ring: A New Architecture for Ring MANs" Sep. 14, 1999 J King Saud Univ vol. 13, Comp & Info Sci pp. 1-18.*
Form PCT/ISA/220, "PCT Notification of Transmittal of the International Search Report and the Written Opinion of the International Searching Authority, or the Declaration," 2 pgs.
Form PCT/ISA/210, "PCT International Search Report," 4 pgs.
Form PCT/ISA/237, "PCT Written Opinion of the International Searching Authority," 5 pgs.

* cited by examiner

*Primary Examiner*—Reginald G Bragdon
*Assistant Examiner*—Kenneth M Lo
(74) *Attorney, Agent, or Firm*—Courtney IP Law

(57) ABSTRACT

Embodiments of a distributed memory controller system implemented on a single integrated circuit device are described. In one embodiment, a memory controller that provides an interconnection circuit between a first plurality of memory devices to a second plurality of memory clients includes a ring bus to route at least one of the memory request and data return signals between the memory clients and the memory devices. The ring bus is configured in a ring topography that is distributed across a portion of an integrated circuit device, resulting in a reduction in the maximum wiring density at the center of memory controller. The ring bus structure also reduces the overall number of interconnections as well as the number of storage elements, thus reducing the total area used by the memory controller.

21 Claims, 11 Drawing Sheets

400

MEMORY CONTROLLER WITH RING BUS FOR INTERCONNECTING MEMORY CLIENTS TO MEMORY DEVICES

FIELD

Embodiments of the invention relate generally to integrated circuits, and specifically to distributed memory controller circuitry on a single integrated circuit device.

BACKGROUND

In many present microprocessor systems, memory controllers are used to connect memory devices, such as DRAM (dynamic random access memory) devices to memory clients. Present memory controller systems often utilize a matrix of switches, such as a crossbar switch matrix, to interconnect a number N of memory devices to a number M of memory clients. FIG. 1 illustrates a presently known memory control system in which memory devices 102 are connected to memory clients 106 through a memory controller 104. In this typical memory controller system, any client 106 can access any memory device 102. This requires each memory device 102 to have a connection path (usually several traces) to each memory client 106. The memory controller 104 receives data request signals from the memory clients and in response, returns data to the clients after performing data access cycles over bi-directional lines connecting the memory controller to the memory devices.

The memory controller 104 typically includes a number of switches that route the request and return signal traces from each memory device to each client device. For layout purposes and to keep the trace lengths as short as possible between the memory devices and memory clients, the memory controller 104 is usually a unified circuit that is physically placed in the center of the integrated circuit (chip). For memory circuits that feature high densities, that is one with many memory devices and/or many memory clients, the number of request and return paths increases geometrically. This can result in very high wiring densities in the switching portion of the memory controller circuit, typically in the center of the chip. The high wiring density required by the memory controller switches can also result in high electrical noise during periods of increased memory access cycles.

Thus, present memory controller circuits, such as those illustrated in FIG. 1 are disadvantageous in that their layout requires that a memory controller be physically placed in the center of the chip, and contain a high wire density circuit, which can make layout and routing difficult, and create a high degree of noise and heat during operation.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

Embodiments of a distributed memory controller system implemented on a single integrated circuit are described. In one embodiment, a memory controller that provides an interconnection circuit between a plurality of memory devices to one or more memory clients includes a ring bus structure to route the request and receive signals from the memory clients to the memory devices. The ring bus structure is distributed across a portion of an integrated circuit device, resulting in a reduction in the maximum wiring density at the center of memory controller, by pushing the interconnect wiring density to the periphery of the memory controller integrated circuit device where densities can be lowered. The ring structure also reduces the overall number of interconnections as well as the number of storage elements, thus reducing the total area used by the memory controller. The memory controller also includes deadlock avoidance mechanisms that utilize virtual channels on the ring bus for one or more defined types of bus traffic.

In the following description, numerous specific details are introduced to provide a thorough understanding of, and enabling description for, embodiments of a memory controller system. One skilled in the relevant art, however, will recognize that these embodiments can be practiced without one or more of the specific details, or with other components, systems, and so on. In other instances, well-known structures or operations are not shown, or are not described in detail, to avoid obscuring aspects of the disclosed embodiments.

Ring-Based Returns

Figure 1:
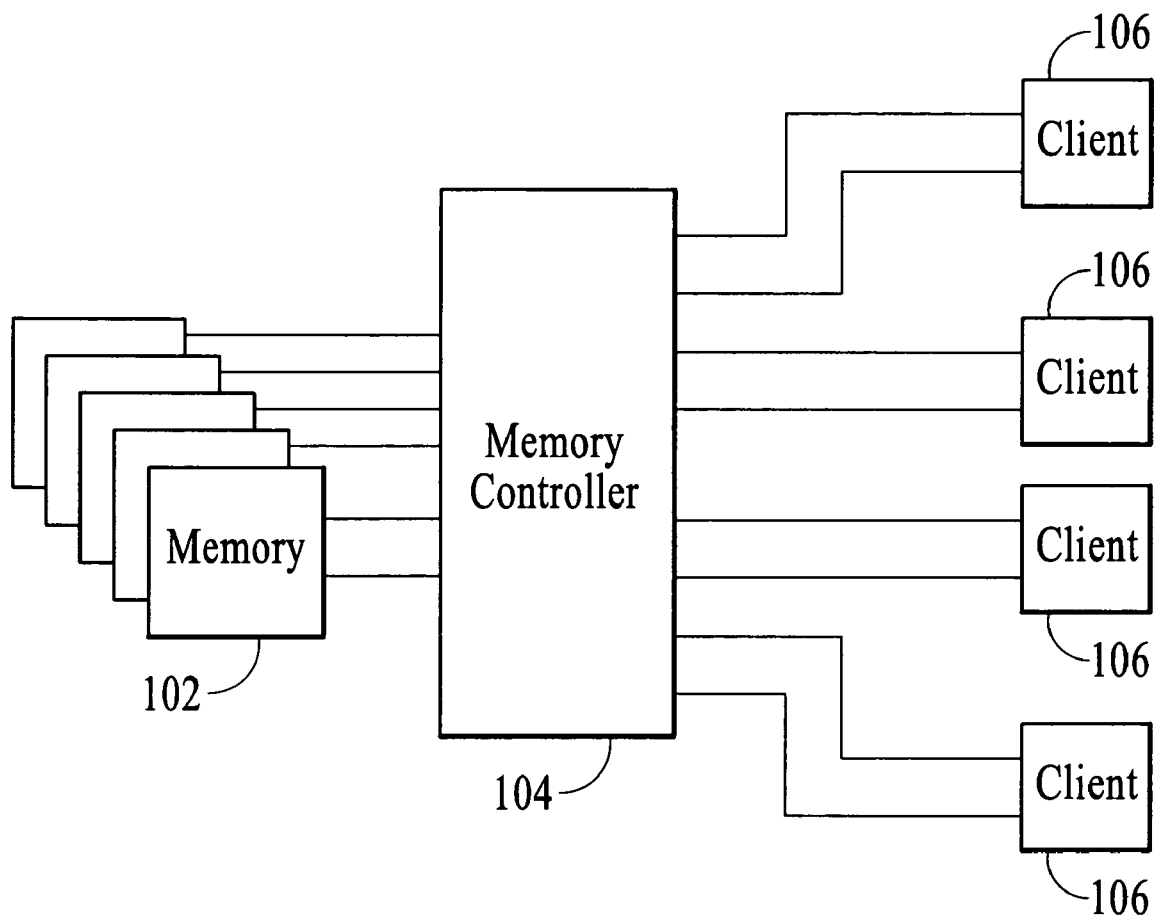
FIG. 1 illustrates prior art memory controller system.
Figure 2:
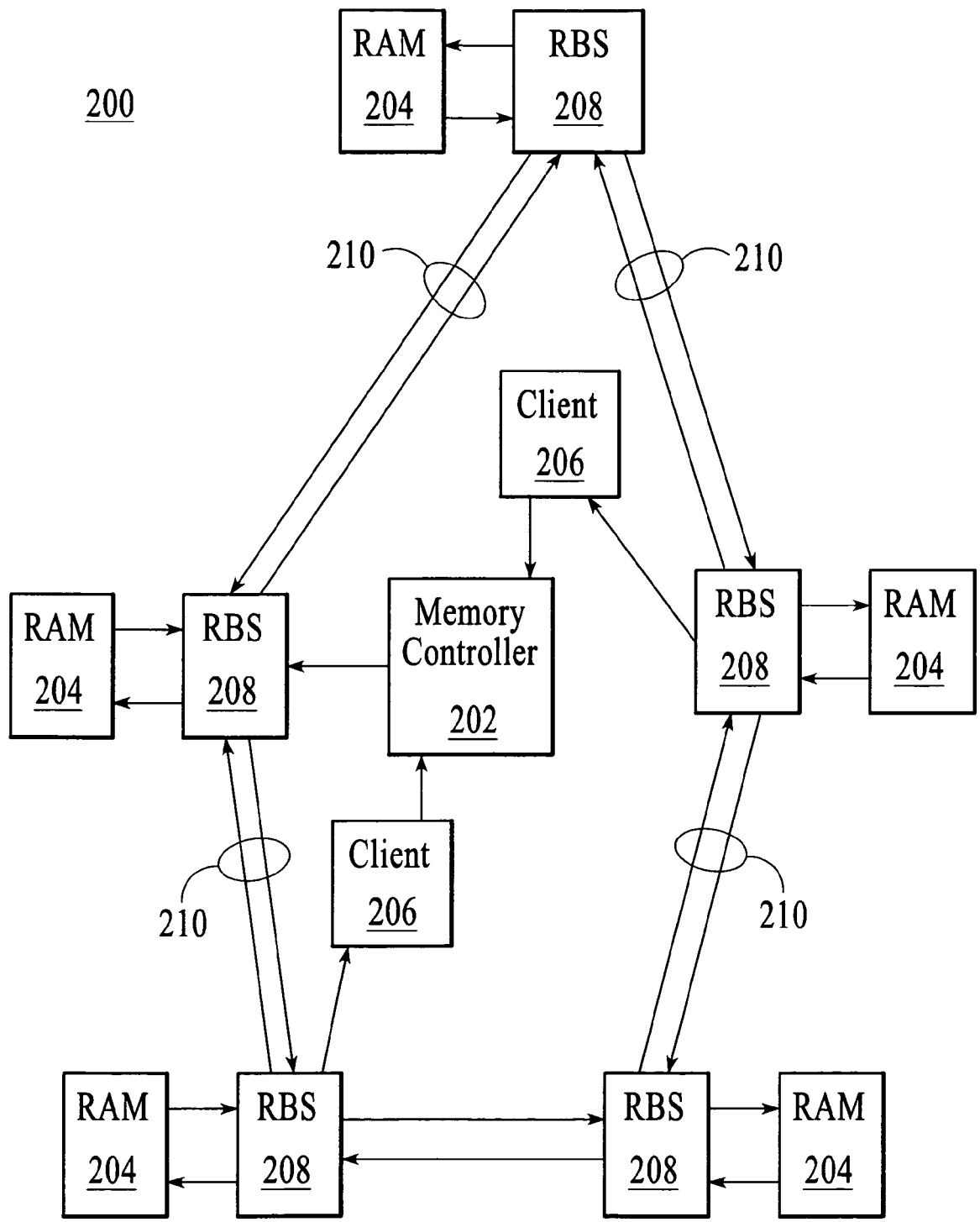
FIG. 2 illustrates a memory controller that connects a plurality of memory devices to a plurality of memory clients and that includes a ring bus for memory requests, according to an embodiment.

Memory controller circuits are used in a variety of different microprocessor systems to interconnect a number of memory devices to memory clients. FIG. 2 illustrates a partially distributed memory control system 200 that connects memory devices to memory clients, according to an embodiment. For the embodiment illustrated in FIG. 2, a memory controller circuit 202 provides an interconnection between a plurality of memory devices (RAM) 204 and a plurality of memory clients 206 through a crossbar, or similar switch matrix. Memory control system 200 also includes a ring bus structure 210 to route at least the memory return signals from the memory devices to the memory clients. The ring bus structure 210 is distributed across a portion of a unitary integrated circuit device containing the memory controller 202 and memory clients 206. The memory control system 200 includes a plurality of read bus switches 208 that are connected to one another over ring bus 210. Each memory device 204 is coupled to a respective read bus switch 208, and each client is coupled to the memory controller and at least one read bus switch. For the embodiment illustrated in FIG. 2, each of the memory controllers 202, clients 206, and read bus switches 208 are included on the same integrated circuit chip. The memory devices 204 are off-chip and coupled to a respective read bus switch circuit 208 through appropriate interfaces. Memory clients 206 represent circuitry, logic processes, microprocessor components, or the like that access memory data through read/write operations to the memory devices 204. A client reads data from a memory device by issuing a read request and then receiving return data from the memory. A client writes data to a memory device by issuing a write request followed by the write data to the memory. In one embodiment, memory control system 200 can be embodied as part of a microprocessor (CPU) or graphics processor (GPU) chip. In this case, the memory clients are typically logic circuits that perform specific functions that rely on memory transfer operations.

The memory controller 202 includes a number of switches, such as a crossbar switching circuit for transmitting memory requests from the memory clients to the memory devices. The memory controller 202 determines which memory device is physically closest to the client 206 that that has the requested data. A request from a memory client is transmitted to the memory controller 202. The switches within the memory controller 202 then route the request signal to the corresponding read bus switch 208 that is coupled to the appropriate memory device 204. During a normal memory access cycle, a memory request from client to a particular target memory device is answered by a data return from the target memory to the requesting client. For the embodiment of FIG. 2, the return signal from the target memory device is routed on the ring 210 that couples the read bus switches to one another. The ring 210 provides the shortest physical path from a memory device back to the client. The memory control system 200 enables return signals from memory devices to clients to be transmitted through lines that can be optimally placed on the memory controller chip, as opposed to through the memory controller 202, which typically resides in the center of the chip. This generally eases the signal routing requirements in the center of the chip and can improve the performance of memory access operations.

Figure 3:
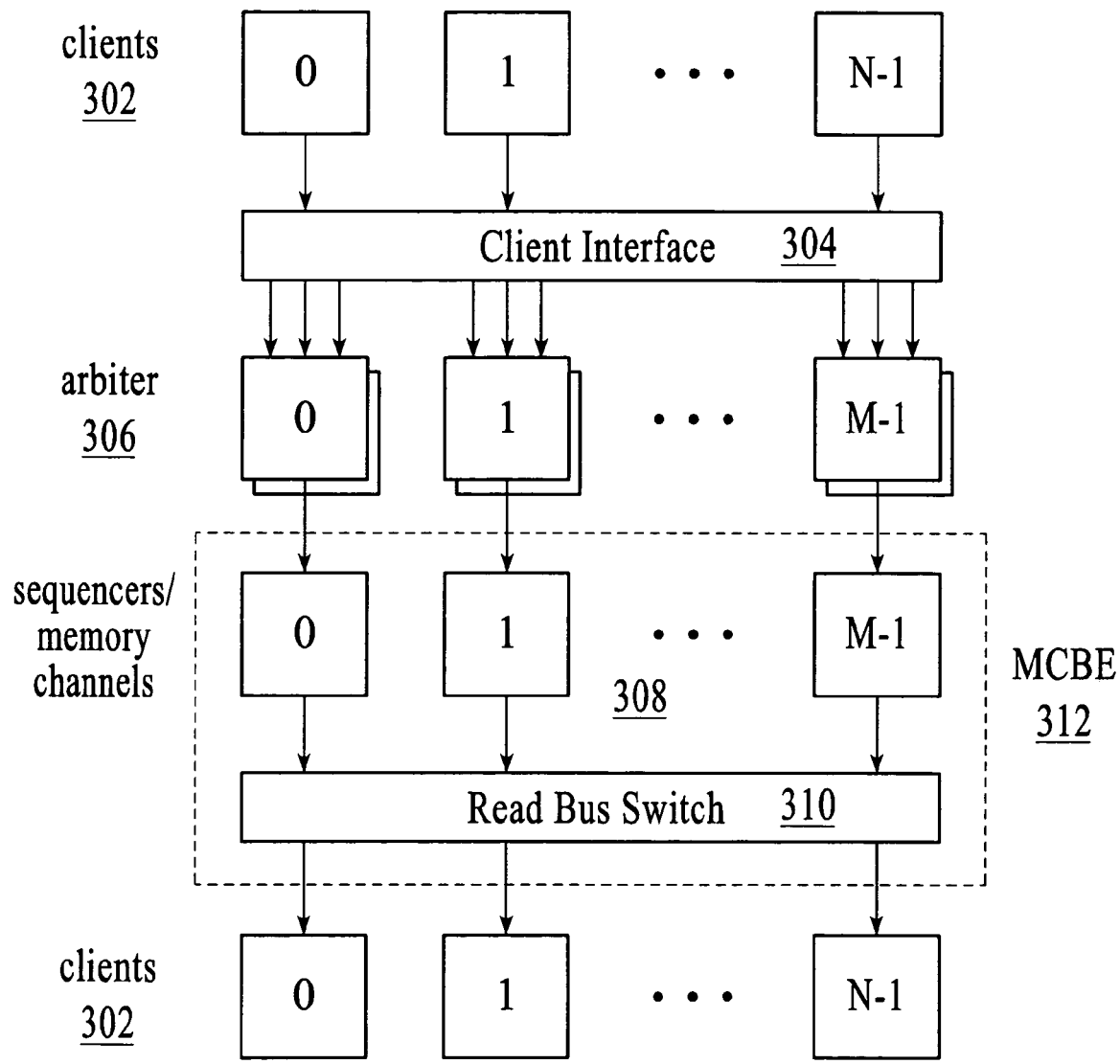
FIG. 3 is a block diagram of the memory control system illustrated in FIG. 2, according to an embodiment.

FIG. 3 is a block diagram of the memory control system illustrated in FIG. 2, according to an embodiment. As illustrated in FIG. 3, a number, N, clients 302 (denoted 0 to N-1) are coupled to M memory channels 308 (denoted 0 to M-1) through a client interface 304 and corresponding arbiter circuits 306. The clients are also coupled to the memory channels through read bus switch 310. In one embodiment, the M memory channels 308, including sequencers, and read bus switch circuits are referred to as a memory controller "back-end" unit (MCBE) 312.

Figure 4:
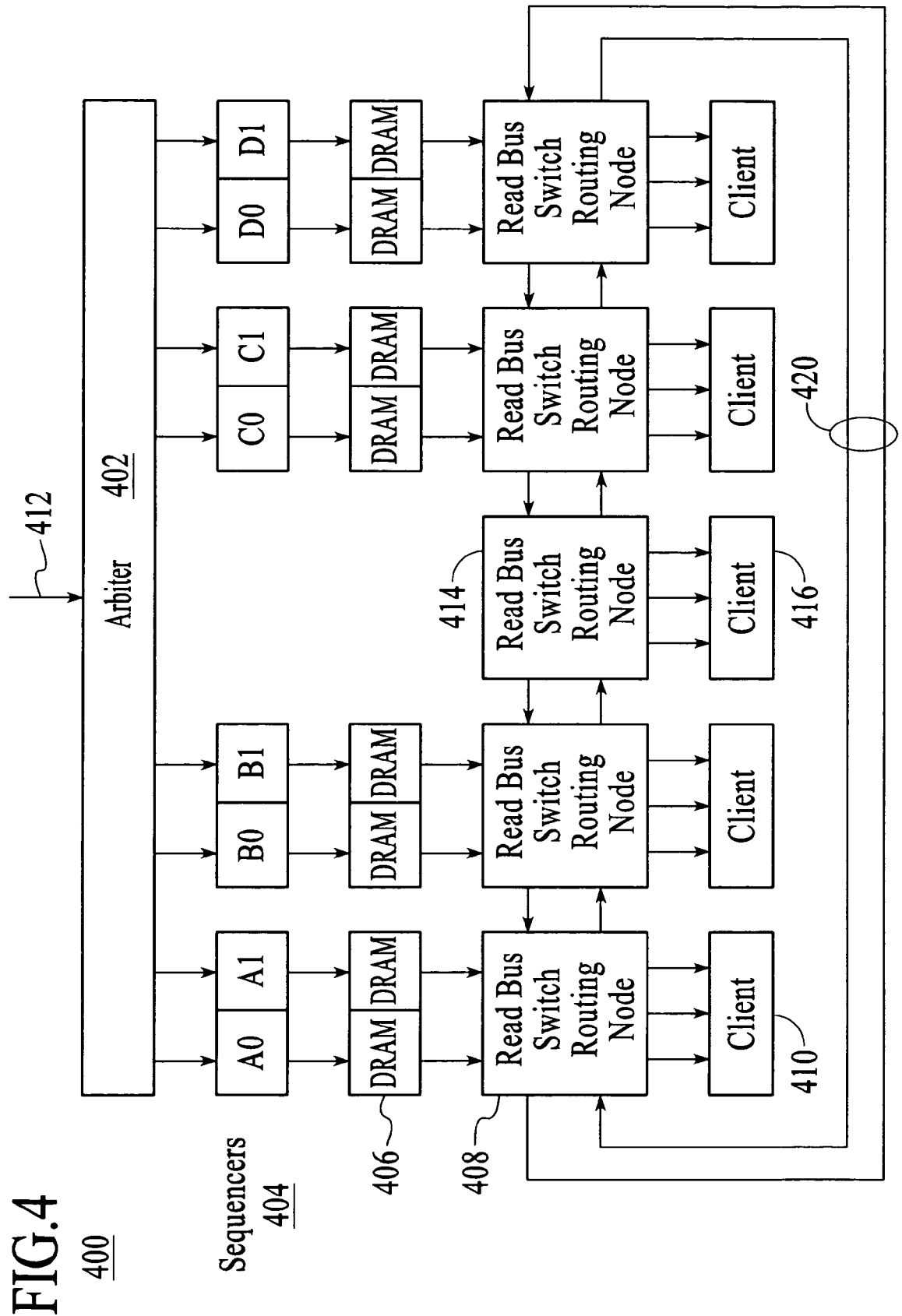
FIG. 4 is a block diagram that illustrates the back-end unit of the memory controller system of FIG. 3, according to an embodiment.

FIG. 4 is a block diagram that illustrates the back-end unit of the memory controller system of FIG. 3 in greater detail, according to an embodiment. The back-end unit 400 receives the memory access signals 412, which are requests from clients, through arbiter circuit 402. The signals are input to sequencers 404. In one embodiment, each sequencer supports from one pair to four pairs of 32-bit memory channels with an increment of one pair at a time. In general, a sequencer circuit is a protocol generator that transforms client request into the electrical signals needed to access the external memory devices 406. Clients 410 access the memory devices 406 through read bus switch routing nodes 408. Certain of the memory access and control signals from the clients to the memory are routed on ring bus 420 which is a data transfer bus that is routed through each of the read bus switches.

For the embodiment illustrated in FIGS. 3 and 4, it can be assumed that the memory controller has eight 32-bit channels. Each pair of sequencers shares the same memory clock, but is asynchronous to others. Depending upon the specific implementation and technologies used, the memory clock speed can be as high as 1.2 GHz. A pair of sequencers can share a single DRAM address bus. This implementation helps to reduce the pin count in the memory controller. In one embodiment, the sequencers 404 use a 4-entry column operation (COP) buffer to hide row activation latency. As stated above, it is assumed that the memory (DRAM) devices 406 are external to the integrated circuit device that contains the arbiter 402, sequencers 404, read bus switch 408 and clients 410. The memory control system 400 can also include an externally accessible read bus switch 414 that can route signals to clients 416 that are not intended to access memory devices, but rather external devices. Such a read bus switch can be used when the memory controller system 400 is configured to interface with or plug into a host system, through a PCI (peripheral computer interface) or the like.

As illustrated in back-end circuit 400 of FIG. 4, the memory access signals are transmitted from the sequencers 404 to respective memory devices 406 and then to read bus switch routing nodes 408. The read bus switch routing nodes include read bus switches that route the memory signals to the appropriate client devices, such as clients 410 shown in FIG. 4. As shown in FIG. 4, the read bus switch circuits are coupled to one another through two signal rings 420 running in opposite directions. This corresponds to the counter-rotating ring bus structure 210 shown in FIG. 2. The maximum distance between any two clients in memory system 200 is the diameter of the ring 210. As shown in FIG. 4, memory read data enters the rings through the routing nodes 408. Each routing node is connected to two sequencers and one or more clients. The clients are circuits or devices that read or write to the external memory devices 406. For example, in a graphics memory controller environment, each routing node can be connected to three clients (color, depth, and texture) of a graphics pipe. Other examples of clients include special processing circuitry of a microprocessor that may embody aspects of the memory controller 400. For example, such a client may be a Discrete Cosine Transform circuit (DCT) for a multimedia CPU. Depending upon the actual implementation and application of the memory control system, different numbers and types of memory controllers can be interconnected to different numbers and types of memory devices through the illustrated ring bus structure and read bus switches.

In one embodiment, a bypass line can be used to allow local traffic to go through the memory controller without entering the ring. For example, data from one of the memory channels of a routing node can be transmitted to a client within the same node. To reduce control circuits, the memory controller can be configured to that traffic on the rings is not flow controlled. For this embodiment, data is stalled at a routing node before entering a ring if its designating client is not ready. The routing map can be programmable, and additional relays can be added throughout the ring for timing closure. The embodiment illustrated in FIGS. 2 and 3 can generally remove routing congestion from the center of a typical memory controller chip to the periphery and reduce routing complexity to $O(n)$ instead of $O(n^2)$ for a similar crossbar design. In one embodiment, the data width of each ring is 256-bits running at system clock (e.g., 500 MHz). This is generally sufficient to support eight 1.2 GHz 32-bit memory channels.

Figure 5:
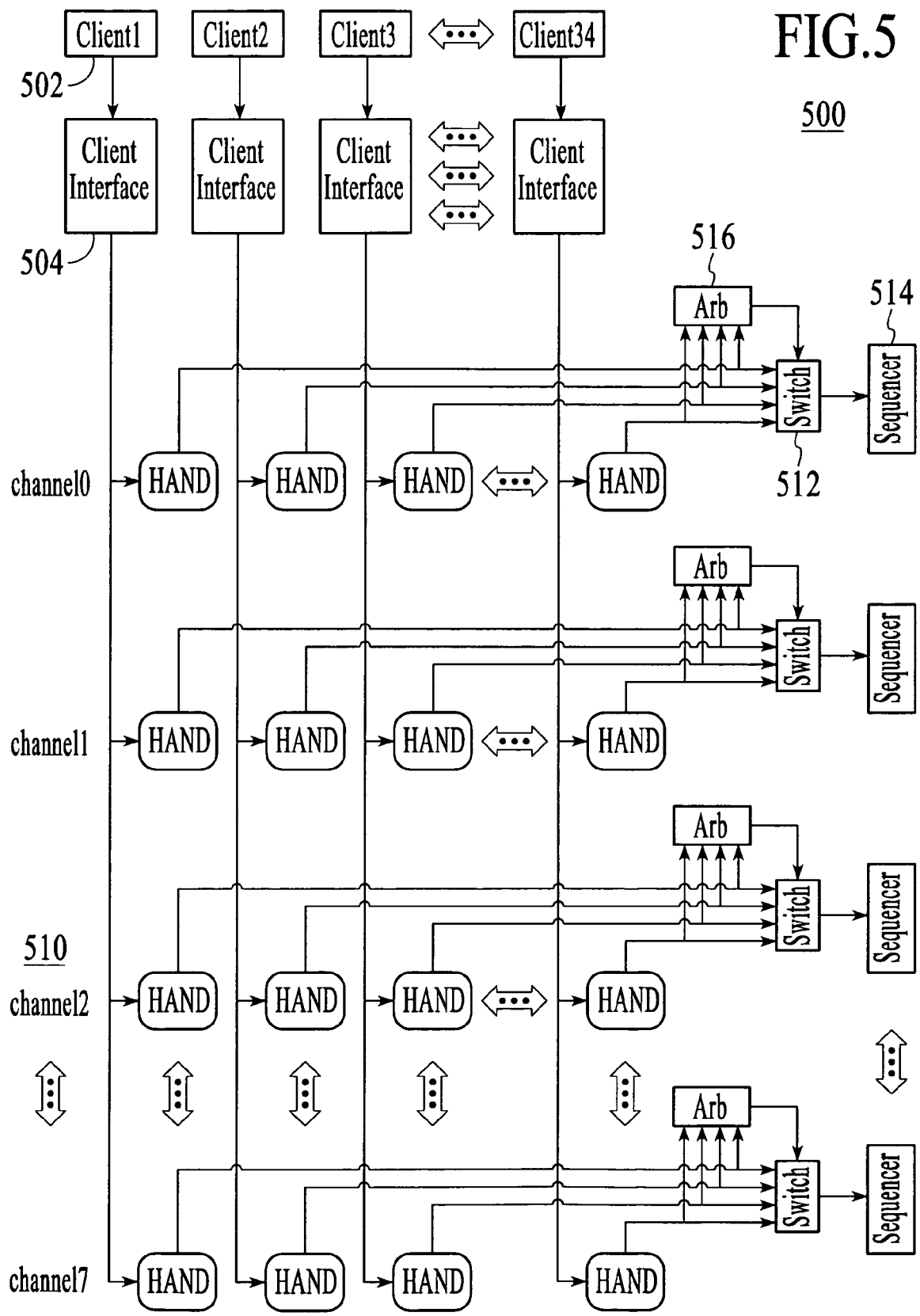
FIG. 5 illustrates a logical architecture of the ring-based memory controller of FIG. 3, according to an embodiment.

FIG. 5 illustrates a logical architecture of the ring-based memory controller of FIGS. 2 and 3, according to an embodiment. The memory controller circuit 202 includes a switching matrix for routing request signals from memory clients to memory devices. FIG. 5 provides a more detailed diagram of such a switching circuit. In circuit 500, each column represents requests from a single client 502 to all memory channels 510, and the rows represent requests from all clients to a single memory channel. FIG. 5 illustrates an example with 35 clients (denoted Client0 to Client34) and eight memory channels (denoted Channel0 to Channel7). As shown in circuit 500, each client 502 interfaces directly with its own client interface 504, which contains the flow control protocol for that client, and a buffer deep enough to compensate for worst case timing. Read and write clients may be considered separate and unique by the memory controller. In one embodiment, read clients utilize a single-cycle, non-multiplexed read request protocol. The command word contains address, size and tag fields. No phase bit is needed for a single request. Alternatively, the read request client can communicate with the memory controller through a two-clock cycle multiplexed command word. In one embodiment, the command word consists of five fields: address, size, byte-swap bits, routing tag, and phase, although other configurations are possible. When a read request client wants to read more than one granule of data, the memory controller duplicates that return tag so that it can be sent with each granule. An additional field is returned with each duplicate tag to identify each granule. The memory controller retains the sequential order of granules for each tag when returning the data. Thus, the data returned within the same memory channel for one request with multiple granules will be in order. For every requester, handshake signals are used to control the request-accept-transfer sequence. The handshake signals can include, ready-to-receive, read request, transfer complete, data read, returned read data tag, and returned read data tag ID signals. Similarly, in one embodiment, write clients communicate with the memory controller using a two-cycle write request protocol. Handshake signals, such as ready-to-receive, valid write data, and write request command, can be used to control the request-accept process. Data transfers are under control of the write clients by asserting write requests for each word to be transferred. Each transfer is qualified by a write mask to be transferred with the data.

In one implementation for the embodiment illustrated in FIG. 5, read or write requests are transmitted through a per-process page table (PT) translation look-aside buffer (TLB) in the client interface 504. The request can be taken as a physical address and passed to a channel decoder. For systems in which virtual memory is available and enabled, each address is looked up in a page table that has been previously loaded into a curtained area of local memory. Channel decoders route the memory access signals from the clients 502 to the appropriate memory channel 510. Once the physical "linear" address is known, a channel multiplexer decodes it into a physical DRAM address (channel, bank, page, and column) or a system memory address, and broadcasts that to the entire column of handlers (HAND) 510.

For the embodiment illustrated in FIG. 5, each client has one handler 510 per channel. Each handler receives the broadcast of the DRAM address from the channel decoder, and if that broadcast channel matches the channel of the handler, it accepts the request into a buffer. The output of that buffer feeds the request directly into a respective switch 512. The handler also keeps track of the "burst length," which is the number of pending consecutive accesses to the same physical DRAM page. It also calculates a "weight" for the pending request, which is a combination of the latency requirement of that particular request, and the probability that the burst length will increase in a period of time. Both the weight and burst length are processed by an arbitration process.

In one embodiment, each read and write handler can store a predetermined number (e.g., 16 or 8) of requests in a FIFO buffer. The output weight is calculated based on the probability of getting another request in the current page. The weighting function can be configured to facilitate the notion of "lazy arbitration," wherein a number of system clock cycles must occur after the last valid request within a single burst enters the read handler before that handler will be considered valid for arbitration. This helps to ensure that there is a full and efficient set of requests to be issued.

As shown in circuit 500, there is one switch 512 per channel 510. In general, each switch is a large multiplexer with a sequencer interface on the output. Each switch accepts input from every handler in the channel, and a switch will only switch between clients when all accesses to the same physical DRAM page have been exhausted. In this way, a burst access will not be interrupted. At the end of each burst, the switch issues a "close page" command to the respective sequencer 514, and accepts a new winner from the arbiter 516. In one embodiment, there is one arbiter 516 per channel. The arbiter works to balance efficiency of memory transfers versus the latency of the transfers. Memory efficiency is maintained by rotating through the banks of memory with enough consecutive requests to hide each bank's precharge and activate time. The goal is to keep valid data on the memory data bus at all times. To accomplish this, the arbiter keeps a simple running model of the current state of each memory bank, and it attempts to assign a winner such that its data accesses can cover the precharge and activate of any other bank in the channel. Each request is then assigned an efficiency rating. This rating is linearly and programmable combined with the requests weight calculated by the handler to result in a final set of client weights. The request with the maximum weight is determined to be the winner. The current winner is presented to the switch on every cycle, and the weights, burst lengths, and memory model are also updated every cycle. The switch may not take the winner every cycle, as it may be stalled or busy, but the arbiter will continue to update the winner. This ensures that the most up-to-date winner is taken by the switch 512.

For the embodiment illustrated in FIG. 5, the output from each switch 512 is input to a sequencer 514. As shown, there is one sequencer per memory channel, and each sequencer takes a request from its corresponding switch and issues the correct commands to the memory to activate the correct bank and page, and then requests the data. It also accepts a "page close" signal from the switch, in which it commands the memory to precharge the bank last used. Read data returning from memory is placed into a read bus switch. As illustrated in FIGS. 3 and 4, the read bus switch comprises a number of read bus switch routing nodes that control the flow of data signals over two counter-rotating rings. The read data is transmitted through the read bus switch coupled to the target memory over the ring bus and to the requesting memory client. The routing switches may be placed close to the periphery of the integrated circuit comprising the memory controller system. Thus, for this embodiment, return data is circulated along busses that are placed at or near the periphery of the chip containing the memory controller. This generally improves the routing of signal lines and the timing of the memory access operations.

Ring-Based Requests and Returns

The embodiments shown in FIGS. 3 through 5 illustrate a ring-based memory controller in which client requests to memory are transmitted through a central memory controller circuit that includes a crossbar switch (e.g., memory controller 202), and return signals are transmitted on a ring (e.g., ring 210). In an alternative embodiment, the memory controller system can be configured such that both request and return signals are transmitted over a ring. Thus, for this embodiment, the memory controller circuit is essentially distributed fully throughout the entire chip. The distributed memory controller features a memory control circuit per physical DRAM channel. Each memory controller receives requests from a set of physically local clients. Local requests have high bandwidth and low latency, while non-local requests have proportionally higher latency and lower bandwidth. A ring bus couples the memory controllers to one another and carries read requests, write requests, read data, write data, write acknowledgements, page table cache lookups, register programming commands, and client status information, among other signals.

Figure 6:
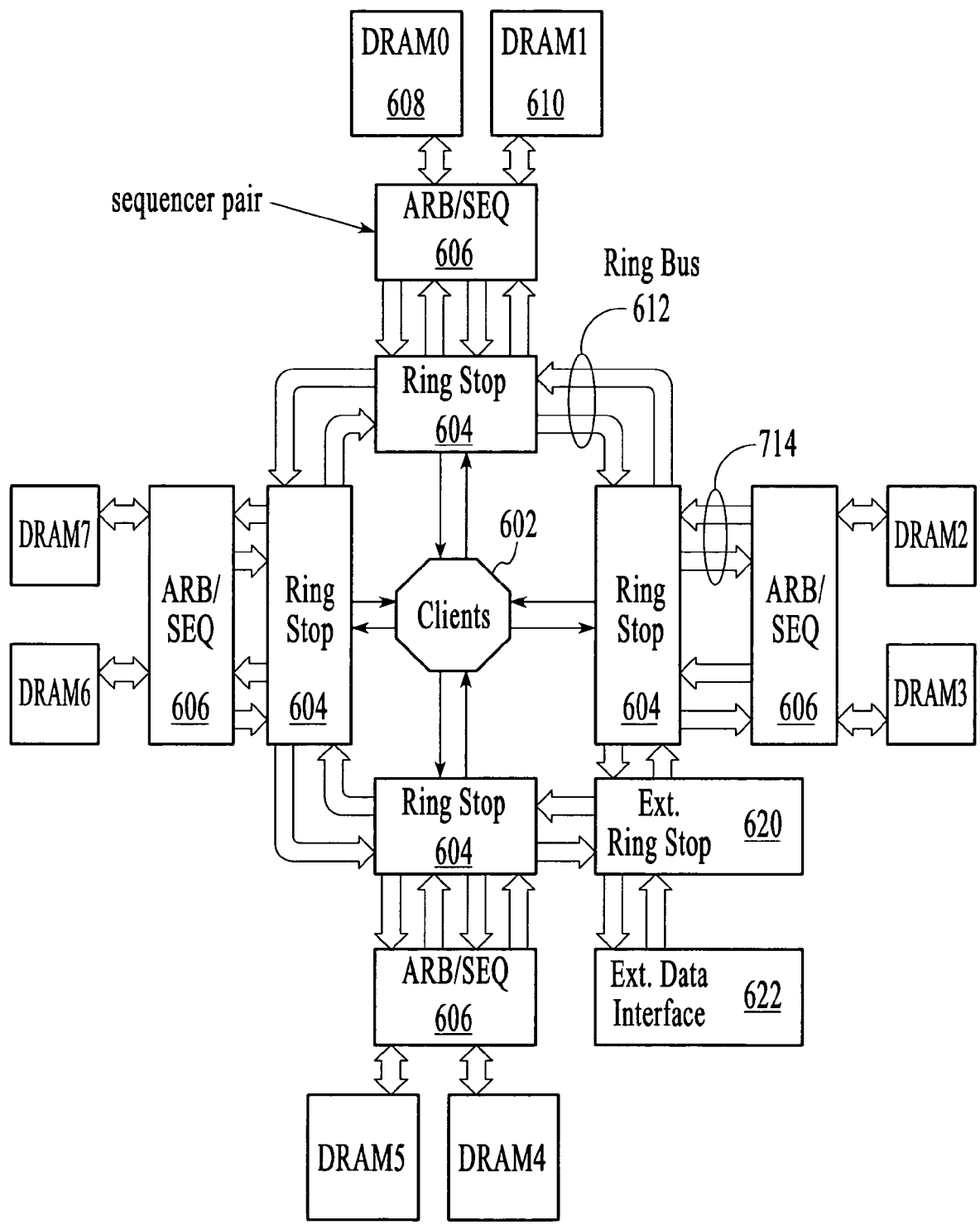
FIG. 6 is a block diagram of a distributed memory controller system that includes a ring bus for memory request and read operations, according to an embodiment.

FIG. 6 is a block diagram of a distributed memory controller system that includes a ring bus for memory request signals and read data transfers, according to an embodiment. As shown in system 600, DRAM device pairs 608 and 610 are connected to a ring stop circuit 704 through an arbiter/sequencer circuit 606. A plurality of ring stops 604 are connected to each other through a ring bus 612 that includes two counter-rotating transmission lines. One or more memory clients, represented by block 602 and shown graphically in the center of the system, are connected to the ring stop circuits 604. The interface between the arbiter/sequencer circuit 606 and each memory devices 608 and 610 can be over a single bi-directional bus, as shown, or over dual unidirectional busses, or any appropriate bus structure for the particular DRAM devices being accessed.

In one embodiment, each ring stop circuit 604 contains a set of local client interfaces. For example, for each memory controller, there could be two to four read clients and one to three write clients. The ring stops 604 can be included within a memory controller circuit that also include page tables (translation lookaside buffers), channel decoders, a set of virtual read and write handlers, and interfaces for the arbiter and sequencers 606. A special ring stop circuit 620 can provide access to an external data interface 622 for access to external devices other than memories.

The ring bus structure 612 illustrated in FIG. 6 is configured to transmit all read request, control and data transfer signals between the clients 602 and the memory devices 608 and 610. The clients transmit request signals through the ring stops 604. These request signals are then routed over ring bus 612 to the appropriate target memory device. In return, the target memory transfers the data to its nearest ring stop which routes the data over ring bus 612 to the appropriate ring stop for the requesting client 602. Memory write cycles are handled in an analogous manner.

As with the embodiment illustrated in FIG. 2, all circuit components illustrated in system of FIG. 6, except for the individual memory devices DRAM0 to DRAM7 are included on the same integrated circuit chip. These include the clients, ring stops, arbiter/sequencers, and ring bus structure. The ring bus structure 612 greatly reduces the circuit density in the center of such a chip by distributing the routing lines between the clients and the DRAM interfaces around the periphery of the chip.

Figure 7:
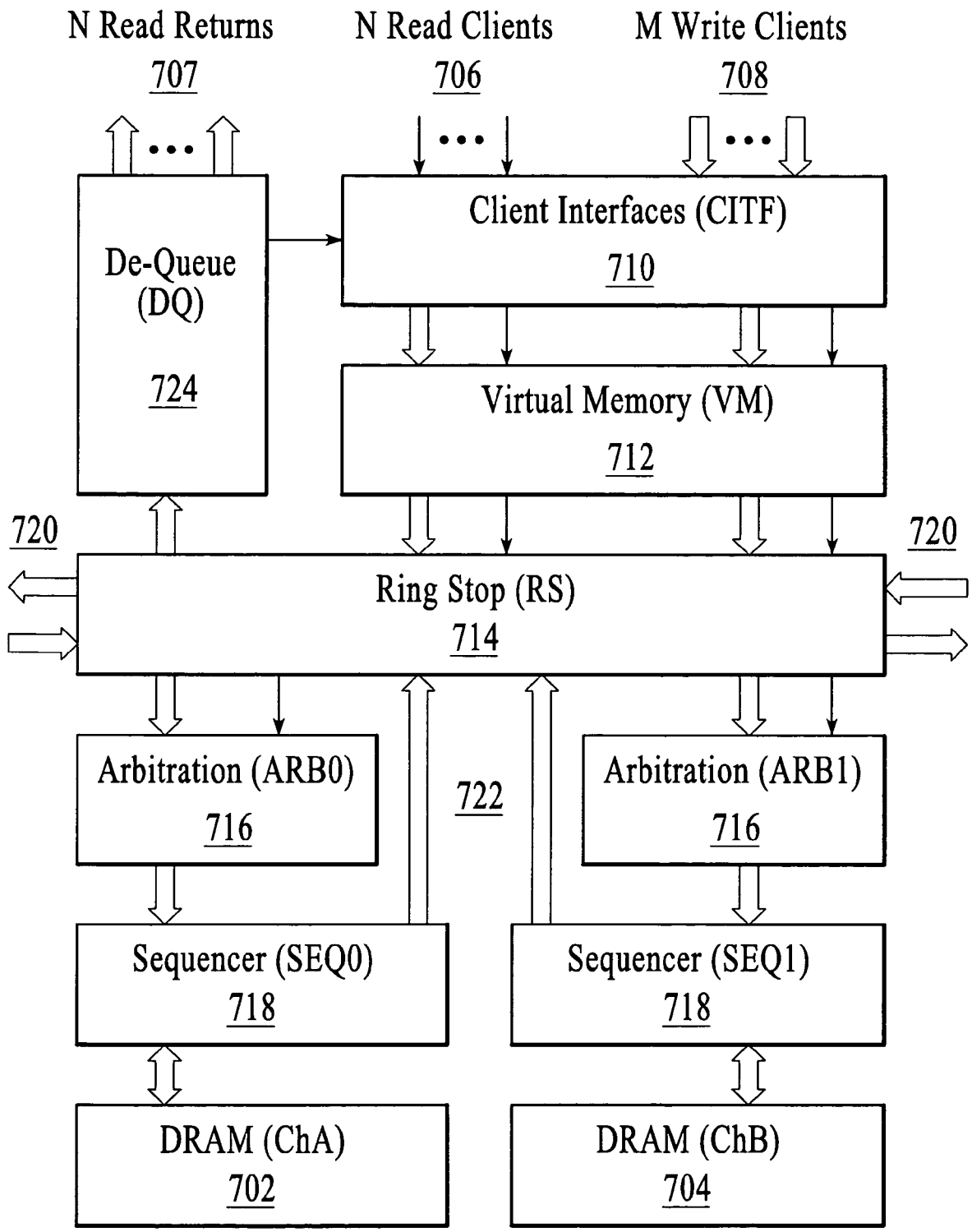
FIG. 7 is a more detailed block diagram of the memory controller circuit shown in FIG. 6, according to an embodiment.

FIG. 7 is a more detailed block diagram of the memory controller circuit shown in FIG. 7, according to an embodiment. FIG. 7 illustrates an application in which N read clients and M write clients access two channels 702 and 704 of a 32-bit DRAM device. The read request signals from the N read clients 706 and the write data from the M write clients 708 are input to a client interface circuit 710. These signals are then passed on to a virtual memory block 712 and to a ring stop circuit 714. Each DRAM channel 702 and 704 has a respective arbitration circuit 716 and a sequencer circuit 718. The read clients receive read data 707 from the DRAM channels from the arbiter/sequencer through the ring stop circuit 714 and a de-queue circuit 724. The counter-rotating ring bus 720 is connected directly to the ring stop circuit 714 in the memory controller circuit.

Figure 8:
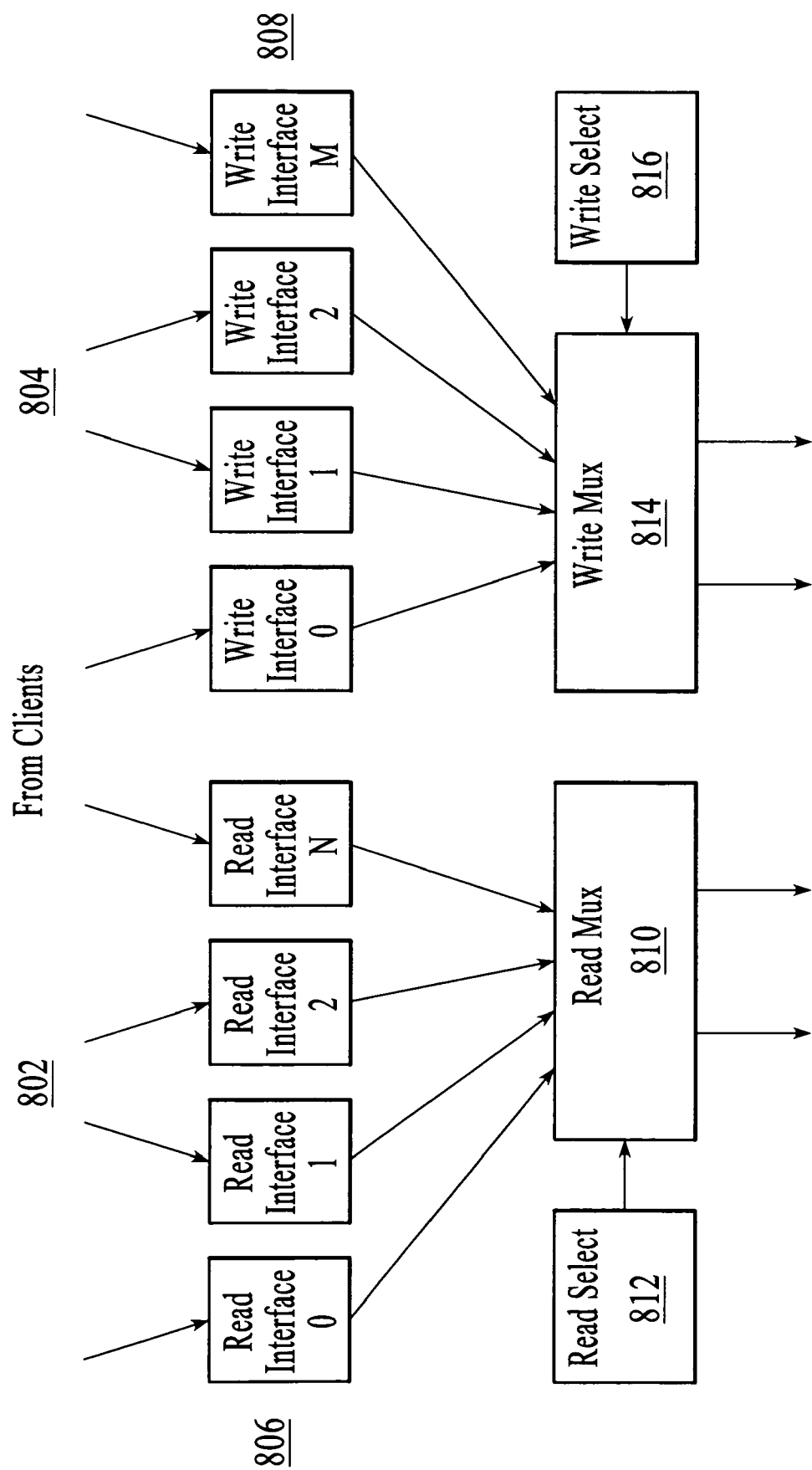
FIG. 8 illustrates a client interface circuit for the memory controller of FIG. 7, according to an embodiment.

In one embodiment, each memory client interfaces directly with a memory controller through its own client interface circuit 710. The client interface circuit contains all data pins as well as the flow control protocol for that client. In some cases, the number of ports on a ring stop does not necessarily equal the number of memory clients. In addition, read clients and write clients are considered separate and unique by the memory controller. FIG. 8 illustrates a client interface circuit for a memory controller, according to an embodiment in which a number of clients are multiplexed to a fewer number of input ports on a ring stop. Read signals 802 from the N read clients are received by N read interface circuits 806, and write signals 804 from the M write clients are received by M write interface circuits 808. The read signals are transmitted to a read multiplexer 810, which is controlled by a read select circuit 812, and the write signals are transmitted to a write multiplexer 814, which is controlled by a write select circuit 816. The arbitration of the select signals by the read and write selects 812 and 816 can be a four level priority fair round-robin scheme. Each interface arbitration weight is calculated by its reported urgency level minus the number of the respective client requests that are outstanding. Priority levels are a range function of the arbitration weight and can be programmable per interface. Other arbitration schemes can also be used in conjunction with the read and write select functions.

In one embodiment, the arbitration function performed by the memory controller circuit illustrated in FIG. 7 is configured to order or re-order the memory requests from the memory clients in a manner that maximizes the memory efficiency. In order to do so, the arbitration circuit is typically configured to keep valid data on the DRAM data bus as all times, or at least as often as possible. In one embodiment this is accomplished through the use of a weighting algorithm that assigns weight values to each memory request and calculates the request with the maximum weight during each cycle. The current winner is presented to the switch on every cycle.

In one embodiment, the memory controller system includes one or more mechanisms to eliminate deadlock in the ring. In general, there are two possible types of deadlock possible in the ring: read/write deadlock, and multi-hop deadlock.

Read/write deadlock can occur because read requests and write acknowledgements share the same physical bus, as do read returns and write requests. To prevent this type of deadlock, the memory controller system treats the four data types (read requests, write acknowledgments, read returns, and write requests) as unique virtual channels. The use of unique virtual channels generally ensures that no one data type can stall any other data type.

Multiple-hop deadlock where all transactions of any one data type are trying to move around the ring through two or more ring stops. If the circuit reaches a state where each and every ring input buffer is full with transactions targeted at the next ring stop which has a full input buffer, no ring stop can drain any request and the ring is deadlocked. To avoid this state, the memory controller system includes a Next Ring Stop (NRS) virtual channel. The ring input buffer has one or more additional entries in the input FIFO buffer that are reserved for NRS traffic only. When this buffer fills past the NRS threshold, no new traffic is accepted onto the ring, and only NRS traffic is allowed to propagate. Thus NRS traffic always has buffer space, and the ring avoids deadlock. It should be noted that the NRS buffer does not have to be implemented on every ringstop to be functional, it only needs to be present on at least one ringstop to ensure deadlock free operation. In this embodiment, the amount of buffer reserved for NRS is programmable per ringstop such that the settings can be adjusted to give the highest typical throughput for a given traffic pattern.

Figure 9:
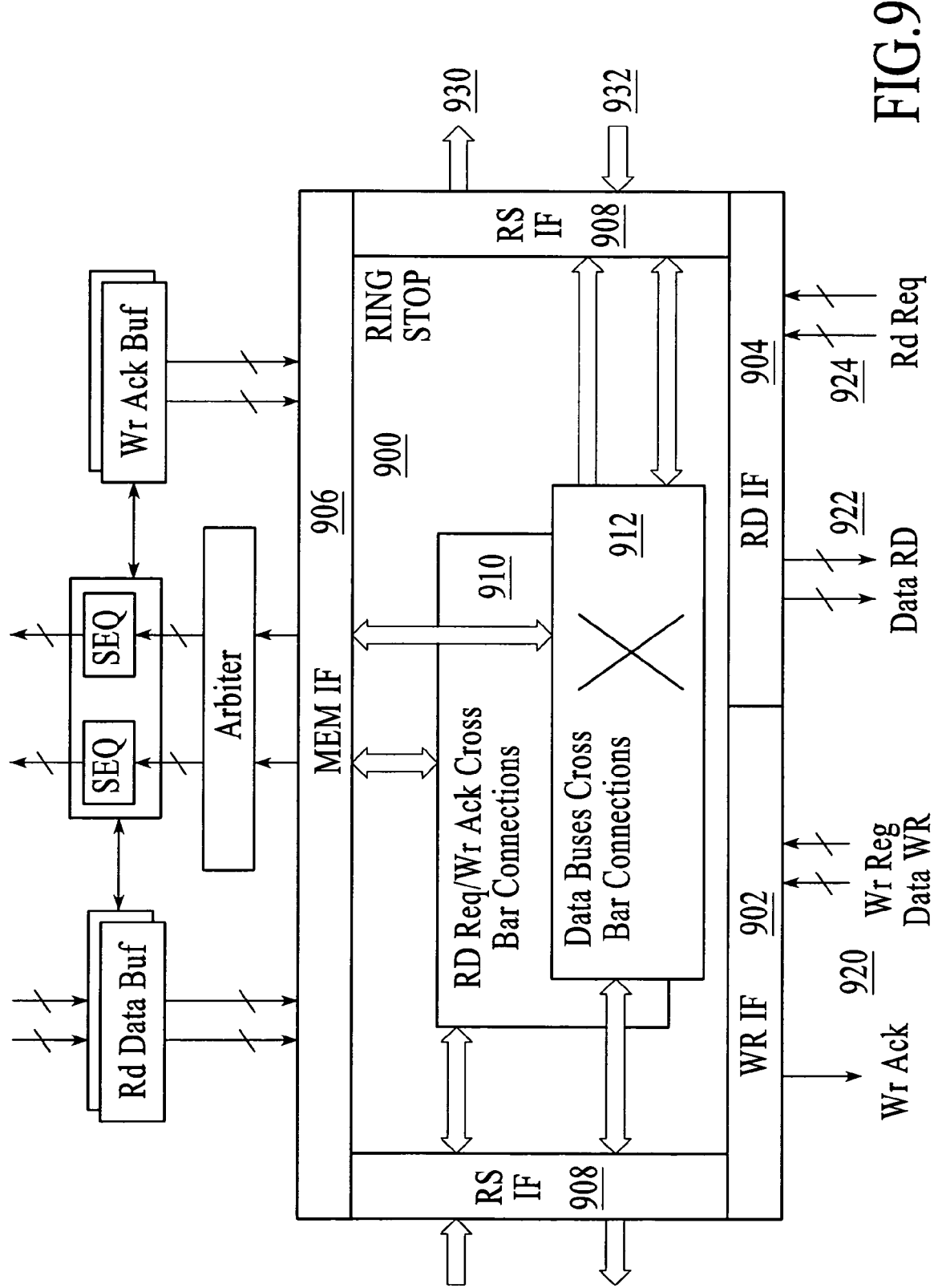
FIG. 9 is a diagram of a ring stop circuit for use in the memory controller of FIG. 8, according to an embodiment.

The ring stop circuits 714 shown in FIG. 7 are responsible for providing the ring bus entry points for clients and memory. Each ring stop manages read/write virtual traffic queues and may implement separate virtual read/write data channels to prevent ring bus (read/write) deadlock, as well as an NRS virtual channel to prevent multi-hop deadlock. The memory controller topology illustrated in FIG. 6 illustrates an example of a circuit that includes five routing nodes (ring stops). Four of these serve high bandwidth traffic and one low bandwidth, latency sensitive real time traffic clients. Each ring stop within the memory controller of FIG. 7 consists of several interfaces. The number and configuration of the interfaces can vary depending upon the actual implementation of the memory controller circuit. FIG. 9 illustrates a ring stop for use in the memory controller of FIG. 7, according to an embodiment. For the example ring stop circuit of FIG. 9, the client interface can include write data ports 902, read data ports 904, for "read request" and "write acknowledge" signals; while the sequencer interface 906 might include write data and read data ports, as well as "read request" and "write request" ports. The ring stop circuit 900 also includes two identical ring bus interfaces 908, each one consisting of Data IN ports for input signals 932 and Data OUT ports for output signals 930, and the associated read request and write acknowledge ports. As shown in FIG. 9, the ring stop 900 also includes two separate internal crossbar connectors 910 and 912 for connecting all of the input/output data and the control interface signals.

Although the embodiment of FIG. 9 illustrates two counter rotating rings 930 and 932 as comprising the ring bus structure coupled to the ring stop 900, it should be noted that the number and size of counter-rotating rings can be varied depending upon the system requirements, space constraints and so on. For example, two pairs of counter rotating rings can be used resulting in a quad-ring structure. These rings can be configured so that particular control and/or data signals are carried on rings that are configured or routed in a specific manner. The number and configuration of the crossbar switches 910 and 912 within the ring stop 900 generally depends on the number and configuration of the ring bus lines 930 and 932. If a single ring carries all of the control and data signals, only one crossbar switch may be necessary. In another embodiment, in which four or more transmission lines comprise the ring structure, four or more separate crossbar circuits may be used in the ring stop.

In one embodiment, the ring stop circuit 900 illustrated in FIG. 9 is configured to provide generic interfaces between the various possible memory clients, memories, and ring busses. The ring stop provides the data switch capabilities to manage virtual traffic queues. It can be configured to provide dynamic bandwidth and latency allocation between queues. A special bypass queue may be provided to allow traffic to go through the ring stop without interfering with the ring bus traffic.

In general, a ring stop block receives incoming read/write data traffic, read requests and write acknowledge messages coming from adjacent ring stops, memory sequencers, bus interfaces and virtual memory blocks connected to the ring stop. Each interface shown in FIG. 9 consists of a group of input and output queues. The interface logic sorts the incoming traffic according to the destination address and traffic priority, and places the data into the appropriate data input queue. One high priority and one low priority queue is created in the input queues group for each output interface that the data may be transferred to. All same priority queues in the input queues group are arbitrated using a round-robin algorithm on a clock-by-clock basis on the data burst boundary. High and low priority queues are arbitrated in parallel. Low priority queues may be granted only in the case that no high priority queue arbitration is requested. Thus, the data from only one queue in the group related to the certain input interface may be sent out every clock cycle. This allows data from multiple sources to be sent to the same destination address in the same clock cycle. In order to allow such traffic aggregation, the group of output queues is implemented in each output interface, with one output queue per source. Output queues in such a group are arbitrated in a similar fashion as input queues, that is all output queues related to the same output interface are dynamically mapped into two groups of requestors: high and low priority groups. Queues within each one of those groups are arbitrated simultaneously (through a round-robin algorithm), while high priority traffic always has priority over low priority traffic. In order to increase bandwidth speed and avoid ring stop internal data congestion, aggregated ring stop output bandwidth is higher than input bandwidth so that data may be de-queued and sent out from several output queues simultaneously. An output queue arbitration protocol guarantees that the whole data burst will be sent out before any other queue is granted.

In one embodiment, a fast response flow control (debit/credit interface) is implemented between each group of input queues and appropriate group of output queues. Whenever the output queue associated with a certain source is overloaded, a back pressure signal is generated. In this case, the associated input queue will be excluded from the arbitration and the rest of the queues in the input group will get extra bandwidth. This input/output mechanism allows isolation of traffic flows between all ring stop sources and destinations, and allows for implementation of separate virtual read/write channels. It also avoids head of buffer blockage and provides efficient bandwidth utilization (matching of any input to any output).

Figure 10:
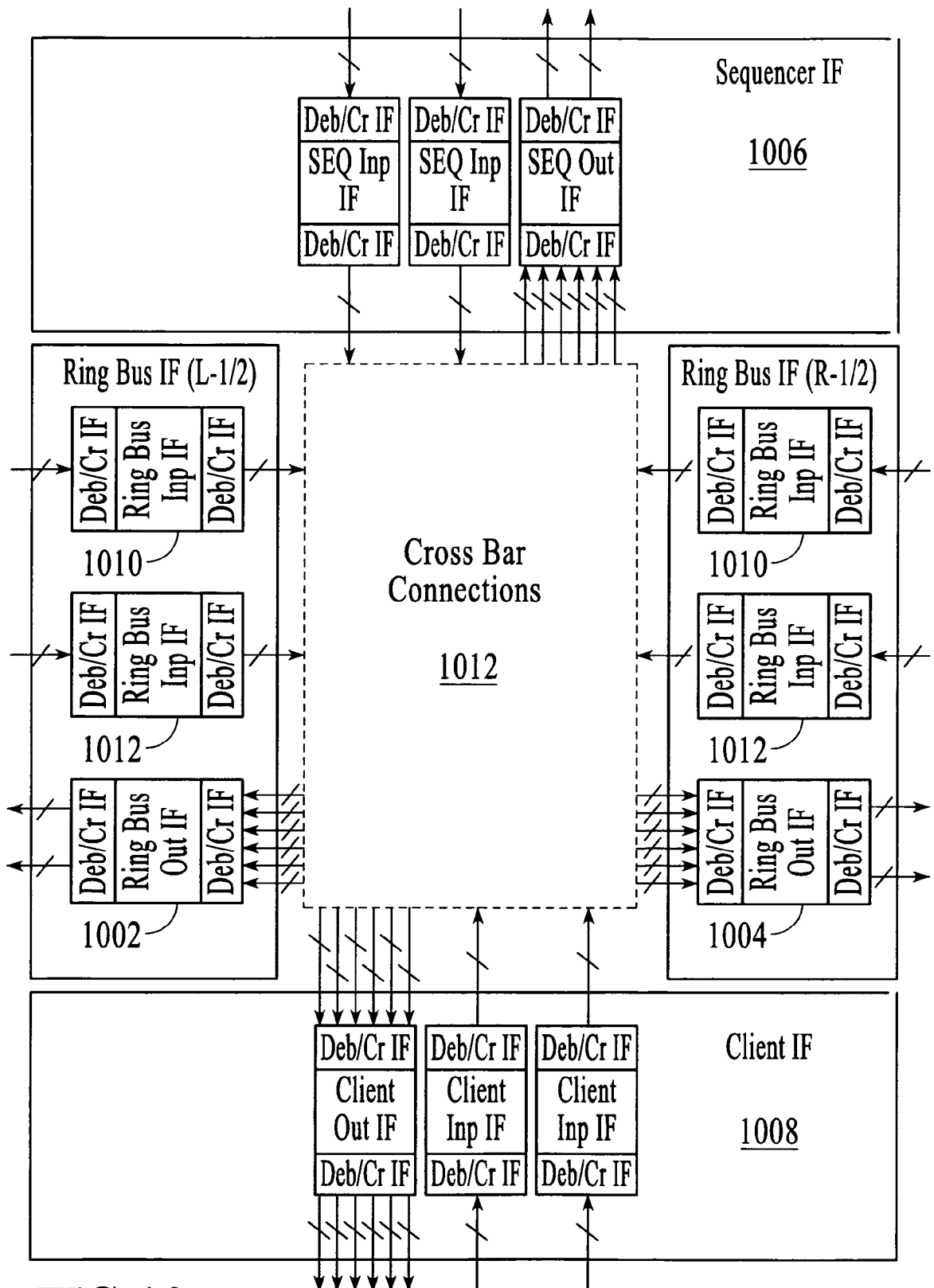
FIG. 10 illustrates major functional blocks and flow control for a ring stop block, according to an embodiment.

FIG. 10 illustrates major functional blocks and flow control for a ring stop block, according to an embodiment. As shown in FIG. 10, the ring stop block consists of two ring bus interfaces 1005 and 1007 to adjacent ring stops (left and right), a sequencer/arbiter interface 1006, a client interface 1008 and a matrix of crossbar connections 1012 between the interfaces. The block diagram of FIG. 10 illustrates the debit/credit interface components for each of the interfaces, under an embodiment. The ring bus interfaces 1005 and 1007 are responsible for providing an entry point for the ring bus into the ring stop block and to arbitrate between input and output traffic going from/to different sources and destinations. As shown in FIG. 10, each ring stop consists of two identical (left and right) ring bus input and output interfaces for data read/write and read request/write acknowledge busses.

For the embodiment illustrated in FIG. 10, each ring bus interface 1005 and 1007 provides an interface for two input and two output ports connected to the ring bus. Each ring bus input interface includes traffic data (TD) shared memory which keeps the data for a set number (e.g., six) of virtual traffic flows (queues), enqueue/dequeue logic, arbitration logic, free memory buffers list memory, a number of FIFO buffers that keep the list of data buffer pointers in TD per queue, and debit/credit transmitter and receiver logic 1004 and 1012. Each ring bus output interface includes a set number (e.g., six) dual port data memory buffers (FIFOs) which keep data coming from a number of possible sources, arbitration and control logic, and debit/credit transmitter and receiver logic.

The sequencer interface similarly includes debit/credit interface circuits 1014 and 1016 for interfacing the signals from the crossbar matrix 1012 to the arbiter/sequencer circuits. Similarly, the client interface 1008 includes debit/credit interface circuits 1018 and 1020 for interfacing the signals from crossbar matrix 1012 to the memory clients. Although FIG. 10 illustrates an embodiment in which a debit/credit (send free) scheme is used, it should be noted that other similar mechanism can be used such as valid ready, RTS/RTR (ready to send/ready to receive) or other similar mechanisms.

With regard to ring bus input interface operations, whenever new data comes from the ring bus, it is classified according to source and destination address and en-queued into one of a low-priority queue or a high priority queue. The following code listing provides an example list of traffic queues for the ring bus input interface, under an embodiment:

| | |
|---|---|
| Low Priority: | RingBUSIF[L/R][1/2]-to-Sequencer (RS-S) |
| | RingBUSIF[L/R][1/2]-to-Client (RS-S) |
| | RingBUSIF[L/R][1/2]-to-NextRingStop Read Channel (RS—RS) |
| | RingBUSIF[L/R][1/2]-to-NextRingStop Write Channel (RS-S) |
| High Priority: | RingBUSIF[L/R][1/2]-to-Sequencer (RealTimeTraffic) (RS-RTT_S) |
| | RingBUSIF[L/R][1/2]-to-Client (RealTimeTraffic) (RS-RTT_C) |
| | RingBUSIF[L/R][1/2]-to-NextRingStop (RealTimeTraffic) Read Channel (RS-RTT_NRS) |
| | RingBUSIF[L/R][1/2]-to-NextRingStop (RealTimeTraffic) Write Channel (RS-RTT_NRS) |

For the above and all following examples, the real time traffic (RealTimeTraffic) represents high priority traffic or a class of high priority traffic. In one embodiment, all of the traffic queues are managed as lists of memory buffers allocated in shared TD memory. A three-level memory hierarchy is implemented in the en-queue/de-queue scheme as follows: The TD memory keeps a number (e.g., 64) of fixed size data buffers; a number (e.g., 8) FIFO buffers keep lists of data buffers pointers for the virtual queues; and free data buffer pointers are stored in the FIFOs. Appropriate en-queue/de-queue logic design and bandwidth allow at least one en-queue and de-queue execution every clock cycle. All queues are eligible to participate in cycle-by-cycle arbitration, unless they are not empty and back pressure indication is not generated by the appropriate output interface. A high/low priority queue (per destination) is excluded from the arbitration process during the time period that a whole burst is not sent out of the queue to avoid interleaving between input and output interfaces.

Real Time Traffic (RTT) queues are generally defined as high priority, while all other queues have normal priority. Both high and normal priority queues are arbitrated separately according to a round-robin algorithm. A normal priority queue will be granted only in the case that all RTT queues are empty or not eligible for arbitration. When another free memory buffer pointer is pushed into the free buffer memory, an acknowledge "Ack" signal is generated to the transmitter side of the ring bus debit/credit interface.

With regard to ring bus output interface 1012 operation, the output interface arbitrates data traffic arriving at the ring bus output stage from the other ring stop input interfaces, which can include sequencer, client, and opposite ring bus interfaces. To allow smooth, uninterruptible data flow, a number (e.g., eight) of small buffers in the form of output queues are incorporated in each ring stop output interface. Each output queue has a point-to-point connection to an appropriate input interface, thus allowing receive data arriving from all possible sources to be simultaneously received. For example, the output interface has separate read and write queues for data coming from opposite side ring bus input interfaces. The output queues are dynamically grouped according to the type of data traffic waiting on the output stage of each queue, into two arbitration groups (virtual channels) consisting of read and write channels. Each channel is further divided into two groups according to traffic priority: high priority (real time traffic) and low priority (normal traffic). The output queues for read and write traffic are arbitrated in parallel, while their relative priority is defined according to an arbiter TDM protocol. The priority duty cycle (bandwidth allocated to each channel) is programmable and may be changed by software, and separately for each ring stop port.

Within each read and write channel, the high and low priority queues are arbitrated in parallel, while two available data output ports are dynamically allocated to serve up to two granted queues simultaneously. Each output port is connected through separate physical debit/credit interfaces to another ring stop input interface. Each physical debit/credit interface is divided into two virtual (read/write) debit/credit interfaces, and a separate send/free counter is implemented for read/write data. The virtual debit/credit interfaces ensure different priority assignments for various types of traffic. The threshold for each traffic type is programmable and may be changed. In order to avoid ring bus deadlock, a certain space should be reserved in the next ring stop input buffer for read/write traffic, high priority traffic, and traffic going to the next ring stop. Each one of those types of traffic can have its own threshold. These threshold values can be freely programmable, however, to ensure deadlock free operation, some limitations should be applied. For example, low priority traffic has a minimal threshold value, low priority traffic going to a next ring stop has a higher threshold value, and high priority traffic has the highest threshold value.

The required minimum distance between the various traffic type threshold values is defined by the maximum burst length for a particular traffic type, and the threshold value is evaluated at the arbitration stage. Thus, for example, a read channel with a maximum burst length of eight requires the reservation of eight entries in the ring stop input buffer for each type of traffic, while the write channel requires only one entry reservation. The minimum threshold value is determined by the ring stop-to-ring stop interface latency. Some spare space can be allocated in the receiver input buffer to compensate for credit counter accuracy, for example in the situation in which some stages of a ring stop output interface pipe line are not included in the count.

Figure 11:
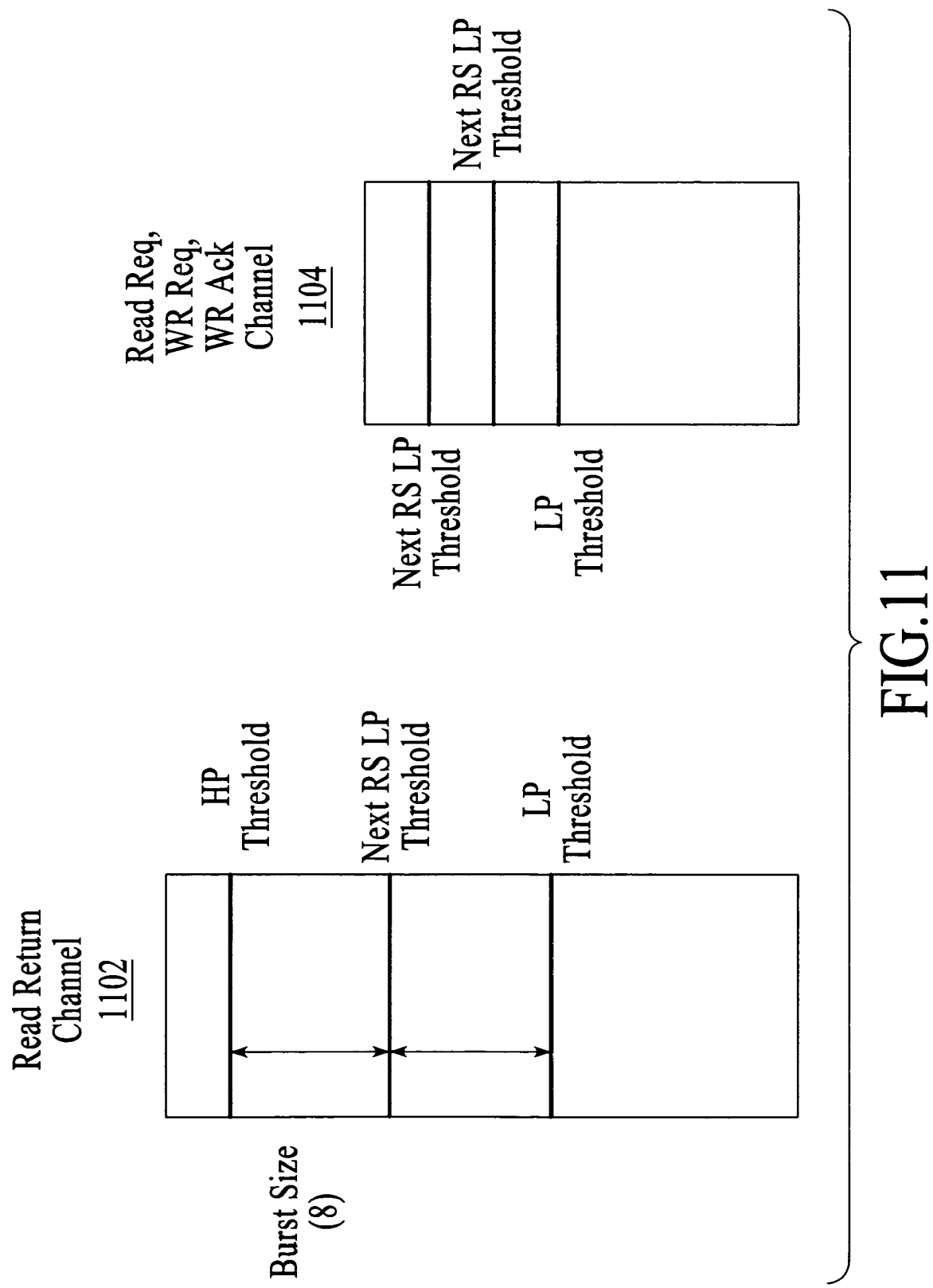
FIG. 11 illustrates the configuration of threshold values for a ring bus output interface, according to an embodiment.

FIG. 11 illustrates the configuration of threshold values for the ring bus output interface, according to an embodiment. As shown in FIG. 11, low, middle and high threshold values are assigned for the read return channel 1102, depending upon the burst size. Similarly, three threshold values are assigned for the read request and write channel 1104. For the example shown in FIG. 11, the following calculations illustrate the determination of the minimum input buffers sizes required for the read and write channels:

| | |
|---|---|
| Read Channel: | R = Interface latency (13) + low priority max burst size (8) + next ring stop max burst size (8) + high priority max burst size (8) + counter inaccuracy (3) = 40. |
| Write Channel: | W = Interface latency (13) + low priority max burst size (1) + next ring stop max burst size (1) + high priority max burst size (1) + counter inaccuracy (3) = 19. |

Thus, for the example above, and illustrated in FIG. 11, the size of the read channel is of value 40, and the write channel is of value 13, as reflected in the relative blocks 1102 and 1104 in FIG. 11. These equations can be used to determine the high priority, low priority, and NR credit values for the read and write channels based on a given input buffer size. For read return and write request, the calculation is: read+write is less than or equal to the input buffer size (e.g., 64).

All ring stop internal input to output interface connections can be implemented with debit/credit interfaces to allow a minimization of output interface buffer size. Whenever, an input interface credit is exceeded, it stops to send new data to an output interface and the corresponding input queue is excluded from any further arbitration process. In one embodiment, the ring stop output interface is configured to allow all data beats belonging to the same return data burst (accompanied by the same read tag value) to be delivered to the client in order, and allow read time transfer write transactions to be delivered to the sequencer in order. It is further configured to allow only one ongoing return data burst to be transferred through the ring stop ring bus output interface simultaneously. This limits the client dequeue block buffer size and avoids deadlock in the input queues. A new burst transaction may be started only after the previous one is finished. The output interface can further be configured to allow all real time transfer transactions to be transferred through one output port only. For example, one port may be utilized for both high and low priority traffic, while the other port is utilized for write low priority traffic only. This helps ensure delivery of all read time transfer write transactions. In order to reduce high priority traffic latency, the priority of packets residing in the output queues may change from low to high in order to allow high priority traffic residing in an input queue to pass through the ring stop output interface as quickly as possible.

As illustrated in FIG. 10, a ring stop circuit according to an embodiment includes sequencer interface 1006. The sequencer interface is responsible for providing an entry point for data coming to and from the memory sequencer/arbiter block and to arbitrate between input and output traffic going from/to different sources and destinations. The sequencer interface includes sequencer input 1014 and output 1016 interfaces for data read/write operations and read request/write acknowledge busses. In one embodiment, the sequencer interface comprises two identical input interfaces, one for read/write data and the other for read request/write acknowledge signals. Each of these input interfaces includes traffic data (TD) shared memory which keeps the data for a number (e.g., four) of virtual traffic queues, enqueue/dequeue logic, arbitration logic, a free buffer list, a number (e.g., four) of FIFO buffers for keeping the list of data buffer pointers in TD (per queue), and debit/credit transmitter and receiver logic. The sequencer interface also includes two identical output interfaces, one for read/write data and the other for read request/write acknowledge signals. Each of these output interfaces includes a number (e.g., six) of dual port data memories (FIFOs) which keep the data coming from a number of different possible sources, arbitration and control logic, and debit/credit transmitter and receiver logic.

The sequencer input interface operation is similar to that of the ring bus input interface, as described above. One difference is that the sequencer input interface does not keep the queue for traffic going from the sequencer input interface to a client's output interface. A special bypass is implemented for this type of traffic and it goes directly to the ring stop client interface. This allows the creation of a separate path for high bandwidth local traffic. All other queues are stored in TD shared memory.

The following code listing provides a list of queues for the sequencer input interface, under an embodiment:

```
SeqIF[1/2]-to-NextRingStopRight (S-NRSR)
SeqIF[1/2]-to-NextRingStopLeft (S-NRSL)
SeqIF[1/2]-to-NextRingStopRight (RealTimeTraffic) (S-RTT-NRSR)
SeqIF[1/2]-to-NextRingStopLeft (RealTimeTraffic) (S-RTT-NRSL)
```

The sequencer output interface arbitrates data traffic coming to the arbiter from all of the other ring stop input interfaces, that is, the ring bus interfaces and local client interface. In order to allow smooth, uninterruptible data flow, a number of relatively small buffers (output queues) are included in the sequencer output interface. Each output queue has a point-to-point connection to a respective input interface to allow for data reception from all possible sources simultaneously. The output queues are dynamically grouped according to the type of data traffic waiting on the output stage of each queue, into three separate arbitration groups: high (real time traffic), normal (bypass traffic) and low (normal traffic) priority. The output queues in the high, normal and low priority groups are arbitrated in parallel, while two available data output ports are dynamically allocated to serve up to two granted queues simultaneously.

As illustrated in FIG. 10, a ring stop circuit according to an embodiment also includes client interface 1008. The client interface is responsible for providing an entry point for data coming to and from the client/arbiter block and to arbitrate between input and output traffic going from/to different sources and destinations. The client interface includes client input 1020 and output 1018 interfaces for data read/write operations and read request/write acknowledge busses. In one embodiment, the client interface comprises two identical input interfaces, one for read/write data and the other for read request/write acknowledge signals. Each of these input interfaces includes traffic data (TD) shared memory which keeps the data for a number (e.g., two) of virtual traffic queues, enqueue/dequeue logic, arbitration logic, a free buffer list, a number (e.g., four) of FIFO buffers for keeping the list of data buffer pointers in TD (per queue), and debit/credit transmitter and receiver logic. The client interface also includes two identical output interfaces, one for read/write data and the other for read request/write acknowledge signals. Each of these output interfaces includes a number (e.g., six) of dual port data memories (FIFOs) which keep the data coming from a number of different possible sources, arbitration and control logic, and debit/credit transmitter and receiver logic.

The client input interface operation is similar to that of the ring bus input interface, as described above. One difference is that the sequencer input interface does not keep the queue for traffic going from the client input interface to a sequencer's output interface. A special bypass is implemented for this type of traffic and it goes directly to the ring stop sequencer interface. This allows the creation of a separate path for high bandwidth local traffic. All other queues are stored in TD shared memory.

The following code listing provides a list of queues for the client input interface, under an embodiment:

```
ClientIF[1/2]-to-NextRingStopRight (C-NRSR)
ClientIF[1/2]-to-NextRingStopLeft (C-NRSL)
```

The client output interface allows buffering of data coming to the client dequeue from all of the other ring stop input interfaces, that is the ring bus interfaces and local sequencer interface. In order to allow smooth, uninterruptible data flow, a number of relatively small buffers (output queues) are included in the client output interface. Each output queue has a point-to-point connection to a respective input interface to allow for data reception from all possible sources simultaneously. The output of each one out of five (or similar number) of client output interface buffers is connected to debit/credit interface logic, which allows smooth, uninterruptible connection to the client dequeue block.

In one embodiment, a number of ring stop routing rules may be implemented to optimize memory accesses and transfer operations. Whenever a ring stop block receives data coming from a sequencer or clients, the best possible routing decisions should be made. The routing decision depends on type of traffic, data source/destination addresses and ring bus congestion status information. To implement the routing rules, each ring stop block is provided with the following information: the number of ring stops in the current ring bus topology, the current ring stop number (each ring stop is assigned a number), the low bandwidth (real time) ring stop number, and the type of data coming into the ring stop. Since each type of traffic has its own requirements for routing, a major parameter for each routing decision is the kind of traffic. Various factors or assumptions are considered for this parameter. These include, read return data belonging to the same read request must be delivered in order, and all data types related to real time traffic (e.g., write request, read request, read return data and write acknowledge) have the highest priority upon arbitration.

Using the above delineated assumptions and factors, the following routing rules can be defined, according to an embodiment:

1. The shortest path to a destination is calculated based on the number of ring stops and account for the number of source and destination ring stops in the current bus topology.

2. If the distance through two paths is the same, the path which does not go through a real time node must be selected.

3. If two possible paths are identical and the data type is not "read return data," the congestion status will determine the routing decision. Congestion is measured according to the amount of data stored in the output FIFOs of the appropriate interfaces.

4. Decisions about read return data routing is based on network topology only. This ensures that "in order" data delivery to the clients.

5. All read return data transactions with the same tag number will use the same ring bus segment. A ring bus segment is determined upon start data arriving. This ensures "in order" data delivery to clients.

Thus, in summary, the routing rules basically dictate that the shortest path to a destination is calculated based on the number of ring stops and the number of source and destination ring stops in the current ring bus topology. If the distance through two paths is the same, the path which does not go through an RT node must be chosen.

Embodiments of a memory controller circuit as described and illustrated may be implemented in or used in conjunction with graphic processing units or microprocessors for use in personal computers, servers, workstations, game consoles, mobile communication devices, personal digital assistants, and any other similar type of computing device.

Aspects of the memory controller circuit embodied on a single IC chip described herein may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list. The words "couple" or "coupled" as used herein mean to connect two items or units directly to one another through a direct connection or indirectly to one another through an intermediate item or unit.

The above description of illustrated embodiments of a memory controller circuit is not intended to be exhaustive or to limit the embodiments to the precise form or instructions disclosed. While specific embodiments of, and examples for, the memory controller circuit are described herein for illustrative purposes, various equivalent modifications are possible within the scope of the described embodiments, as those skilled in the relevant art will recognize.

The elements and acts of the various embodiments described above can be combined to provide further embodiments. These and other changes can be made to the memory controller in light of the above detailed description.

In general, in the following claims, the terms used should not be construed to limit the described system to the specific embodiments disclosed in the specification and the claims, but should be construed to include all operations or processes that operate under the claims. Accordingly, the described system is not limited by the disclosure, but instead the scope of the recited method is to be determined entirely by the claims.

While certain aspects of the memory controller are presented below in certain claim forms, the inventors contemplate the various aspects of the methodology in any number of claim forms. Accordingly, the inventors reserve the right to add additional claims after filing the application to pursue such additional claim forms for other aspects of the described system.

What is claimed is:

1. An integrated circuit device comprising:
a central memory controller circuit coupled to at least one read bus switch and each of the one or more memory clients, and configured to route the memory request to the target memory device, wherein the memory controller circuit comprises, a switch matrix configured to transmit the memory requests from the requesting memory client to the target memory device;

an arbiter circuit coupling each memory client of the one or more memory clients to a respective memory channel;

a sequencer circuit coupling each arbiter to a respective read bus switch corresponding to the requesting memory client; and a client interface coupling the arbiter circuit to the requesting memory client and configured to implement a flow control protocol for the requesting memory client;

a plurality of memory clients operable to send or receive data to one or more memory devices by sending memory access requests to the central memory controller circuit; and a ring bus connected between pairs of read bus switches of a plurality of read bus switches, and configured to transmit a memory read transfer between the target memory device and a requesting memory client, wherein the ring bus comprises a counter rotating ring bus coupling all of the plurality of read bus switches together in a ring topography.

2. The integrated circuit device of claim 1, wherein the bus comprises a plurality of segments, and wherein each segment interconnects a pair of memory control circuits together.

3. The integrated circuit device of claim 1, wherein each memory control circuit includes a memory interface, and wherein the memory devices comprise a dynamic random access memory device separate from the integrated circuit device coupled to a respective memory interface of the plurality of the memory control circuits.

4. The integrated circuit device of claim 3, wherein the memory client is configured to transmit a read request signal to a target memory device and receive a data read signal from the target memory device in response to the read request signal from the memory client; and the memory client is configured to transmit a write request signal to the target memory device and receive a write acknowledge signal from the target memory device in response to the write request signal from the memory client.

5. The integrated circuit device of claim 4, wherein the ring bus is used to transmit the read data signal from the target memory device to the memory client.

6. The integrated circuit device of claim 5, wherein the ring bus is used to transmit the read request signal from the memory client to the target memory device.

7. The integrated circuit device of claim 6, wherein the ring bus is used to transmit the write request signal from the memory client to the target memory device.

8. The integrated circuit device of claim 7, wherein the ring bus is used to transmit the write acknowledge signal from the target memory device to the memory client.

9. The integrated circuit device of claim 8, wherein the ring bus comprises a respective virtual channel for each of the read data, read request, write request and write acknowledge signals to avoid deadlock among each of the read data, read request, write request, and write acknowledge signal types.

10. The integrated circuit device of claim 9, wherein each of the read data, read request, write request, and write acknowledge signal types comprises a high-priority traffic type and a low-priority traffic type, and wherein each virtual channel comprises a respective sub-channel for each of the high-priority and low-priority traffic type of each signal type.

11. The integrated circuit device of claim 8, wherein the ring bus includes a virtual channel denoted a next ring stop channel for high priority traffic of each signal type, and wherein the next ring stop channel utilizes reserved buffer space within one or more ring bus components.

12. The integrated circuit device of claim 4, wherein the ring bus comprises two counter rotating transmission lines.

13. A memory controller coupling a plurality of memory clients on an integrated circuit device to external memory devices, comprising:

a plurality of read bus switches, each read bus switch of the plurality of read bus switches coupled to a respective memory device of the external memory devices;

one or more of the memory clients coupled to at least one read bus switch, and configured to transmit a memory request to a target memory device and receive a memory read transfer from the target memory device in response to the memory request, wherein each memory device represents a dynamic random access memory channel;

a central memory controller circuit coupled to at least one read bus switch and each of the one or more memory clients, and configured to route the memory request to the target memory device, wherein the memory controller circuit comprises, a switch matrix configured to transmit the memory requests from the requesting memory client to the target memory device;

an arbiter circuit coupling each memory client of the one or more memory clients to a respective memory channel;

a sequencer circuit coupling each arbiter to a respective read bus switch corresponding to the requesting memory client; and a client interface coupling the arbiter circuit to the requesting memory client and configured to implement a flow control protocol for the requesting memory client; and a ring bus connected between pairs of read bus switches of the plurality of read bus switches, and configured to transmit the memory read transfer between the target memory device and a requesting memory client, wherein the ring bus comprises a counter rotating ring bus coupling all of the plurality of read bus switches together in a ring topography.

14. The memory controller of 13, wherein each respective memory device comprises a dynamic random access memory.

15. An integrated circuit device including a memory control circuit, the integrated circuit device comprising:

a plurality of read bus switches, each read bus switch of the plurality of read bus switches coupled to a respective memory device located off of the integrated circuit device, wherein each memory device represents a dynamic random access memory channel;

one or more memory clients configured to transmit a memory request to a target memory device and receive a memory read transfer from the target memory device in response to the memory request, and coupled to each read bus switch of the plurality of read bus switches, wherein each read bus switch comprises, a ring stop circuit configured to receive incoming read and write data traffic from adjacent ring stop circuits on the ring bus;

an arbiter circuit coupling the ring stop circuit to a respective memory channel;

a sequencer circuit coupling each arbiter to the respective memory channel; and a client interface coupling the ring stop circuit to the requesting memory client; and a ring bus connected between pairs of read bus switches of the plurality of read bus switches, the ring bus comprising a counter rotating ring bus coupling all of the plurality of read bus switches together in a ring topography, and configured to transmit both memory requests from a requesting client to a target memory device, and memory read transfers between the target memory device and the requesting memory client.

16. The integrated circuit device of claim 15, wherein read and write data traffic is organized using input and output queues in the ring stop circuit, and wherein input and output queues are prioritized depending in one of low priority and high priority data types.

17. The integrated circuit device of claim 16, wherein the arbiter circuit is configured to arbitrate data of the same priority using a round-robin algorithm.

18. A memory controller coupling a plurality of memory clients on an integrated circuit device to a plurality of memory devices, comprising:

a plurality of ring bus stops, each coupled to a respective memory device of the plurality of memory devices;

a memory controller circuit coupled to at least one ring bus stop and each of the plurality of memory clients, and configured to route memory access signals between the plurality of memory clients and memory devices;

a ring bus connected between pairs of ring bus stops, and configured to physically transmit the memory access signals between the plurality of memory clients and memory devices; and a deadlock avoidance circuit comprising a next ring stop virtual channel for each ring bus stop and one or more reserved buffer entries in an input buffer of each ring bus stop, the deadlock avoidance circuit configured to prevent deadlock of the memory access signals on the ring bus, wherein the deadlock comprises multi-hop deadlock caused by filling an input buffer of a ring bus stop with transactions of any memory access signal type, and wherein the memory access signals comprise types consisting of: read requests, write acknowledgments, read returns, and write requests.

19. The memory controller of claim 18, wherein the deadlock comprises read/write deadlock caused by two or more types of memory access signals sharing same physical channel of the ring bus.

20. The memory controller of claim 18, wherein the deadlock avoidance circuit comprises a virtual channel for each of the memory access signal types.

21. The memory controller of claim 20, wherein a subset of memory access signals are designated as next ring stop traffic, and wherein the next ring stop traffic is temporarily stored in the reserved buffer entries when the input buffer exceeds a predetermined storage level.

* * * * *